United States Patent
Zavarehi et al.

(10) Patent No.: US 6,199,007 B1
(45) Date of Patent: Mar. 6, 2001

(54) METHOD AND SYSTEM FOR DETERMINING AN ABSOLUTE POWER LOSS CONDITION IN AN INTERNAL COMBUSTION ENGINE

(75) Inventors: Masoud K. Zavarehi, Peoria; David R. Schricker, Dunlap, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/551,073

(22) Filed: Apr. 18, 2000

Related U.S. Application Data (63) Continuation of application No. 09/282,680, filed on Mar. 31, 1999, now abandoned, which is a continuation-in-part of application No. 09/216,597, filed on Dec. 18, 1998, now Pat. No. 6,082,187, which is a continuation-in-part of application No. 08/676,548, filed on Jul. 9, 1996, now Pat. No. 5,878,366.

(51) Int. Cl.$^7$ .............. G01M 15/00; G06F 19/00
(52) U.S. Cl. .............. 701/111; 123/436; 73/116; 73/117.3; 701/102; 701/110
(58) Field of Search .................. 701/101, 111, 701/110, 102; 123/436, 478, 480; 73/116, 117.3; 180/165

(56) References Cited

U.S. PATENT DOCUMENTS

| | | | |
|---|---|---|---|
| 4,292,670 | * | 9/1981 | Reid et al. .............. 701/118 |
| 4,532,592 | * | 7/1985 | Citron et al. .............. 701/105 |
| 4,562,728 | * | 1/1986 | Timmerman .............. 73/116 |
| 5,528,931 | * | 6/1996 | James et al. .............. 73/117.3 |
| 5,878,366 | | 3/1999 | Schricker et al. .............. 701/101 |
| 6,082,187 | * | 7/2000 | Schricker et al. .............. 73/116 |

* cited by examiner

Primary Examiner—Henry C. Yuen
Assistant Examiner—Hieu T. Vo
(74) Attorney, Agent, or Firm—Kevin M. Kercher; Steven G. Kibby (57) ABSTRACT

A method and system for detecting absolute power loss in a cylinder for a reciprocating internal combustion engine, the internal combustion engine having at least one cylinder and a rotatable crankshaft. This method and system includes sensing rotational crankshaft speed for a number of designated crankshaft rotational positions over a predetermined number of cycles of rotation for each of the crankshaft positions and determining an average crankshaft speed fluctuation for each of the crankshaft positions and determining information representative of crankshaft kinetic energy variations due to each firing event or each firing event and compression event in said cylinder and determining information representative of an average fuel flow rate and determining information representative of power loss for the cylinder as a function of the crankshaft kinetic energy variations due to each firing event, the average crankshaft speed and the average fuel flow rate and responsively producing a representative power loss signal and determining information representative of crankshaft torque as a function of the crankshaft kinetic energy variations due to each firing event and compression event and the average crankshaft speed and responsively producing a representative crankshaft torque signal and determining information representative of absolute power loss for each cylinder.

20 Claims, 3 Drawing Sheets

METHOD AND SYSTEM FOR DETERMINING AN ABSOLUTE POWER LOSS CONDITION IN AN INTERNAL COMBUSTION ENGINE

This is a continuation application of application Ser. No. 09/282,680, filed Mar. 31, 1999, now abandoned, which is a continuation-in-part of application Ser. No. 09/216,597, filed Dec. 18, 1998, now U.S. Pat. No. 6,082,187, issued Jul. 7, 2000, which is a continuation-in-part of application Ser. No. 08/676,548, filed Jul. 9, 1996 (now issued as U.S. Pat. No. 5,878,366).

TECHNICAL FIELD

This invention relates generally to a reciprocating internal combustion engine, and more particularly, to a method and system for determining an absolute power loss condition in an internal combustion engine.

BACKGROUND ART

Power loss conditions in internal combustion engines present several problems, including increased down time and excess exhaust emissions. Excess exhaust emissions are extremely problematic since government regulations are making more stringent demands or limits on the exhaust emissions of internal combustion engines (diesel or spark ignited). Power loss can be caused by complete and/or partial misfires or clogged fuel injectors. The detection of an all-cylinder or absolute power loss condition in each cylinder requires numerous data sets being available for training in order to evaluate each and every cylinder. The presence of these vast training data sets creates an extraordinary burden in determining a multiple-cylinder or all-cylinder power loss condition.

The present invention is directed to overcoming one or more of the problems set forth above.

DISCLOSURE OF THE INVENTION

In one aspect of the present invention, a method for detecting absolute power loss in a cylinder of a reciprocating internal combustion engine is disclosed. The internal combustion engine has at least one cylinder and a rotatable crankshaft. The method includes the steps of sensing rotational crankshaft speed for a plurality of designated crankshaft rotational positions over a predetermined number of cycles of rotation for each of the crankshaft positions and determining an average crankshaft speed fluctuation for each of the crankshaft positions and determining information representative of crankshaft kinetic energy variations due to each firing event or each firing event and each compression event in said cylinder and determining information representative of an average fuel flow rate and determining information representative of power loss for the cylinder as a function of the crankshaft kinetic energy variations due to each firing event, the average crankshaft speed and the average fuel flow rate and responsively producing a representative power loss signal and determining information representative of crankshaft torque as a function of the crankshaft kinetic energy variations due to each firing event and each compression event and the average crankshaft speed and responsively producing a representative crankshaft torque signal and determining information representative of absolute power loss for each cylinder.

In another aspect of the present invention, a system for detecting absolute power loss in a cylinder of reciprocating internal combustion engine is disclosed. The engine has a plurality of reciprocating components including, but not limited to, at least one cylinder and a rotatable crankshaft. The system includes an input mechanism that generates a signal, including a value for rotational crankshaft speed for a plurality of designated crankshaft rotational positions over a predetermined number of cycles of rotation for each of the crankshaft positions and an electronic controller for determining an average crankshaft speed fluctuation for each of the crankshaft positions and determining information representative of crankshaft kinetic energy variations due to each firing event or each firing event and each compression event in the cylinder and determining information representative of an average fuel flow rate and determining information representative of power loss for the cylinder as a function of the crankshaft kinetic energy variations for each firing event, the average crankshaft speed and the average fuel flow rate and responsively producing a representative power loss signal and determining information representative of crankshaft torque as a function of the crankshaft kinetic energy variations due to each firing event and each compression event and the average crankshaft speed and responsively producing a representative crankshaft torque signal and determining information representative of absolute power loss for each cylinder.

BRIEF DESCRIPTION OF THE DRAWINGS

For a better understanding of the present invention, reference may be made to the accompanying drawings in which.

BEST MODE FOR CARRYING OUT THE INVENTION

Figure 1:
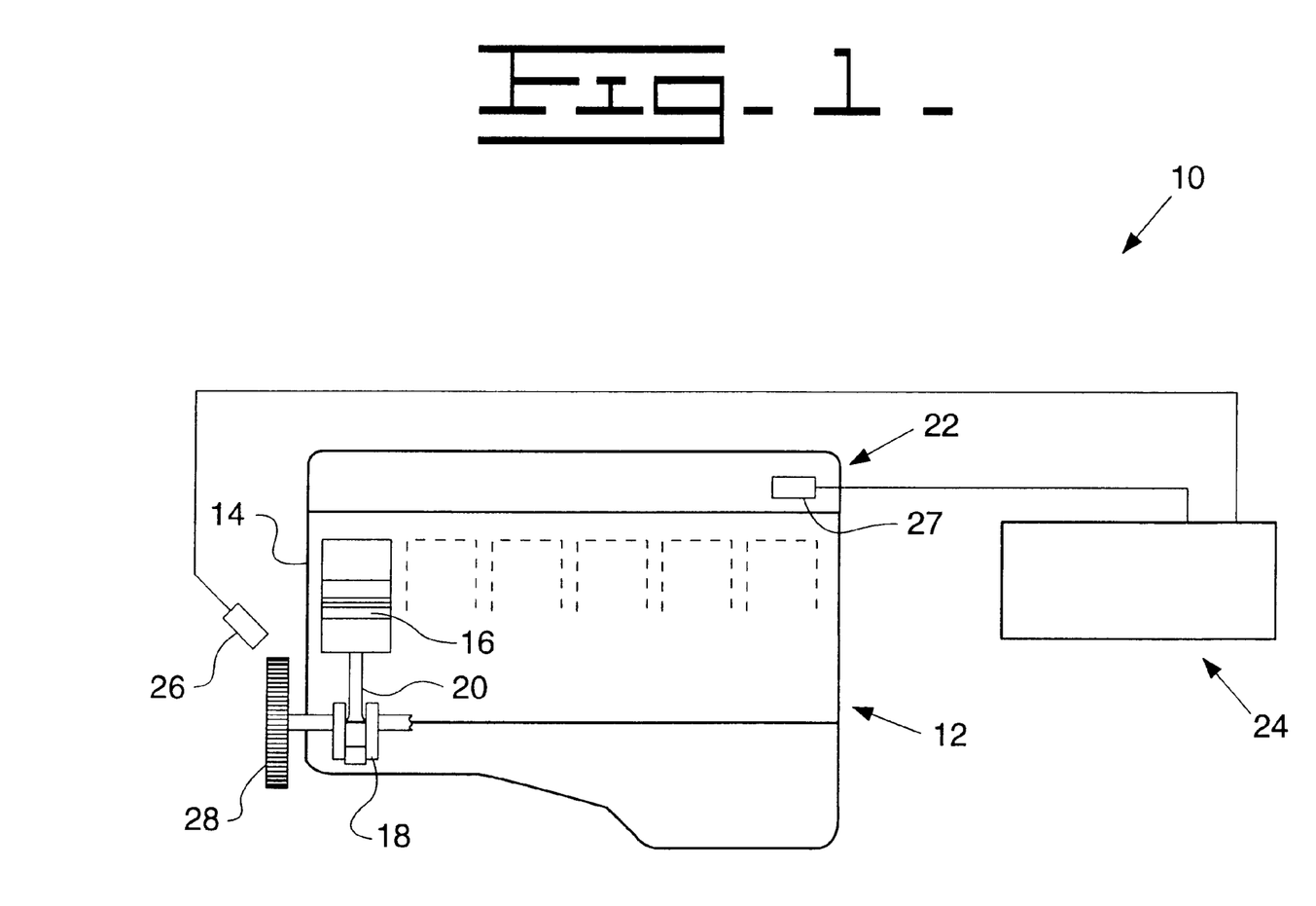
FIG. 1 is a diagrammatic illustration of an apparatus for determining an all-cylinder (absolute) power loss condition in an internal combustion engine according to the present invention.

Referring now to the drawings, and initially to FIG. 1, an electronic control system 10 is depicted for determining an absolute power loss for a cylinder 14 of an internal combustion engine 12. The power loss condition typically indicates degradation of an individual cylinder 14. This can be due to a complete or partial misfire, clogged fuel injector, or some other problem. Preferably, the internal combustion engine 12 can be a six cylinder, compression ignited, diesel engine. However, any of a wide variety of both spark ignited and compression-ignited engines, having one or more cylinders, can be utilized with the present invention. Each of the cylinders, as represented by numeral 14, has a piston 16 reciprocally moveable therein. Each piston 16 is connected to a rotatable crankshaft 18 by a connecting rod 20 for rotating the crankshaft 18. Fuel delivery from a fuel source (not shown) to the individual cylinders of the internal combustion engine 12 can be controlled by a governor 22 in a typical, conventional manner. The governor 22 is operable for controlling fuel delivery to the cylinder(s) 14 of the internal combustion engine 12, and includes a fuel quantity sensor 27 for sensing the amount of fuel requested by the governor 22, which is defined as the fuel flow rate and communicating a fuel quantity signal representative thereof to an electronic control module 24. Preferably, this fuel flow rate can be a derived value that correlates or even equals the rack value instead of utilizing a sensor.

The operation of the internal combustion engine 12 is controlled by an electronic control module 24, which can also be referenced as an electronic controller. The electronic control module 24 can include, but is not limited to, a processor such as a microprocessor, however, any of a wide variety of computing devices will suffice. The electronic control module 24 preferably includes, but is not limited to, a memory device and a clock, and is representative of both floating point processors, and fixed point processors. The electronic control module 24 is operable for receiving information from a variety of sensors and other devices associated with the internal combustion engine 12. This can include, but is not limited to, an engine speed sensor 26 and a fuel quantity sensor 27, both electrically connected to the electronic control module 24. The engine speed sensor 26 is an input mechanism that generates a signal and can be any suitable commercially available device, such as a magnetic speed pick-up that changes its output voltage whenever predetermined indicia is in proximity thereto. A nonlimiting example of such indicia could include angularly spaced teeth 28 on a crank gear of the rotatable crankshaft 18. A typical, but nonlimiting, example of a magnetic speed pick-up would be a conventional electrical transducer. However, numerous other types and methods of speed sensing may be utilized.

Due to the fact that the angular distance between successive indicia, that is, two successive angularly spaced teeth 28, will be known, the speed of the rotatable crankshaft 18 can be determined using the data generated by the engine speed sensor 26. The electronic control module 24 is operable to convert the sensor data, which is a raw voltage, into revolutions per minute (rpm). The engine speed sensor 26 is thus operable for sensing the angular speed of the rotatable crankshaft 18 for a discrete plurality of angular crankshaft positions and responsively producing a crankshaft speed signal that is received by the electronic control module 24. Preferably, the angularly spaced teeth 28 on the crank gear of the rotatable crankshaft 18 are located at ten degree (10°) increments around the gear circumference thereof corresponding to ten degree (10°) increments around the rotatable crankshaft 18. There is a top dead center position for the cylinder 14 that is represented by a missing tooth to provide a reference point. It should be recognized and understood that the angular positions around rotatable crankshaft 18 of the top dead center positions for the remaining five cylinders of the internal combustion engine 12 are also known.

The software for predicting absolute power loss for each cylinder 14 of an internal combustion engine 12 will now be discussed with reference to FIGS. 2A and 2B, which depict a flowchart representative of the computer program instructions executed by the electronic control module 24, as shown in FIG. 1. A programmer skilled in the art could utilize this flowchart to program any of a wide variety of electronic controllers/computers in a wide variety of programming languages. In the description of the flowcharts, the functional explanation marked with numerals in angle brackets, <nnn>, will refer to the flowchart blocks bearing that number.

Figure 2A:
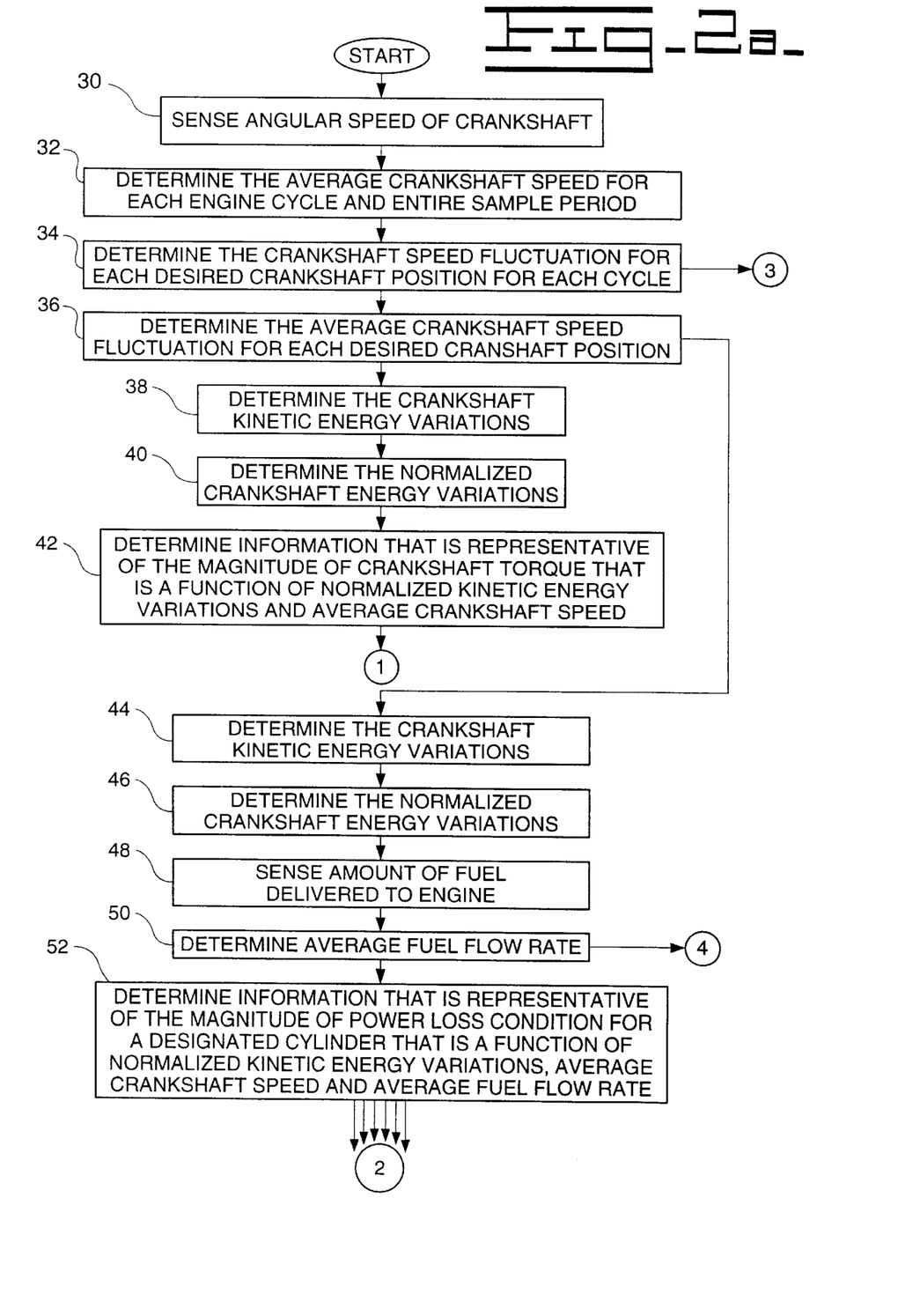
FIGS. 2A and 2B represent a flowchart illustrating software for determining an all-cylinder (absolute) power loss condition in an internal combustion engine according to the present invention.

As shown in FIG. 2A, the software program initially determines the angular velocity or speed of crankshaft 18 as the crankshaft 18 is being rotated <30>. As previously stated, the angularly spaced teeth 28 that are located around the circumference of the crank gear of the rotatable crankshaft 18 provide positional information enabling the angular velocity of the crankshaft 18 at any predetermined position of the crankshaft 18 (preferably ten degrees (10°)) to be sensed over a desired predetermined number of cycles of rotation of the rotatable crankshaft 18, hereinafter defined as the sample period.

The next step in the software program determines the average crankshaft speeds for each engine cycle and for the entire sample period <32>. The third step in the software program is to determine the average crankshaft speed fluctuation for a desired number of crankshaft positions <34>. This is accomplished by subtracting the crankshaft cycle average speed calculated in program step <32> with each crankshaft speed measurement. This will ameliorate the effects of noise and external load disturbance other than the malfunctions that are the object of a detection process. These problems can include, but are not limited to, problems relating to the fuel injector and the like discussed above. This program step also increases the resolution for differentiating between malfunctions and minor cylinder power losses. It should be noted that each cycle of the internal combustion engine 12 comprises two revolutions of the rotatable crankshaft 18 Seven Hundred and Twenty Degrees (720°). This includes a firing event near the top dead center of one of the revolutions. The electronic control module 24 is able to determine the top dead center position using cam gear positional data or the like. The speed data is then preferably arranged into Seven Hundred and Twenty Degree (720°) engine cycle segments measured from a selected top dead center for the cylinder 14. Each speed segment will preferably, but not necessarily, consist of 72 data points corresponding to ten degree (10°) increments for two rotatable crankshaft revolutions per cycle equating to thirty-six (36) angularly spaced teeth 28 around the circumference of the crank gear, including the missing tooth for the top dead center for the cylinder 14 in each revolution of the rotatable crankshaft 18. The average crankshaft speed is preferably determined using at least fifteen (15) to twenty (20) of such speed segments. Here, the standard deviation of the speed segments can be determined as well, and if the speed standard deviation at any point is beyond a certain predetermined threshold (indicating an unsteady condition), new crankshaft speed data should be collected. This predetermined threshold will vary for different sizes and types of internal combustion engines 12.

The fourth step in the software program determines the average crankshaft speed fluctuation at each measured crankshaft position <36>. This is accomplished by summing the deviations at each crankshaft position from program step <34> and taking the average thereof for each crankshaft position.

The software program then utilizes the average crankshaft speed fluctuations determined in program step <36> to determine the information representative of the magnitude of torque for a crankshaft 18 of an internal combustion engine 12 in program steps <38>, <40> and <42> and to determine information that is representative of a power loss condition for a designated cylinder 14 of an internal combustion engine 12 in program steps <44>, <46>, <48>, <50>, and <52>.

Proceeding down the path to determine the information representative of the magnitude of torque for a crankshaft 18 of an internal combustion engine 12 in program step <38>, the kinetic energy variations of the rotatable crankshaft 18 due to each firing event and each compression event for each cylinder 14 are then computed by the electronic control module 24. This computation involves computing the variation in kinetic energy for each firing (combustion) event as well as each compression event. In other words, there are two points (or numbers) per cylinder. This program step involves integrating the average crankshaft speed fluctuation determined in program step <36> with respect to a predetermined angle for the rotatable crankshaft 18 from $\theta_{i1}$ to $\theta_{i2}$.

By integrating the speed of the rotatable crankshaft 18, the amount of speed information for further processing per cycle of the internal combustion engine 12 is reduced from nN to 2N, where n is the number of teeth passing the engine speed sensor 26 per firing of the cylinder 14.

The instantaneous kinetic energy of the rotating parts of the internal combustion engine 12 is given by:

$$E_k = \tfrac{1}{2} I_e \dot{\theta}^2$$

where $I_e$ is the average inertia of all rotating parts of the internal combustion engine 12, and $\dot{\Theta}$ is the instantaneous angular velocity of of the crankshaft 18.

The variation of the shaft kinetic energy due to combustion disturbances is given by differentiating $E_k$, or $$\delta E_k = I_e \delta \dot{\theta}$$

$$\dot{\theta} = I_e \delta \dot{\theta} \frac{d\theta}{dt}$$

where $\delta \dot{\Theta}$ is the small angular velocity fluctuation of the crankshaft 18 about its mean cycle value.

The total amount of kinetic energy that the rotatable crankshaft 18 and other rotating parts have gained or lost during the time period $\Delta t$ is therefore given by integrating $\delta E_k$ with respect to time; i.e., total energy gained (or lost)=

$$\int_{t_i}^{t_f} \delta E_k \, dt = Ie \int_{\Theta_{i1}}^{\Theta_{i2}} \delta \Theta \, d\Theta$$

where $\Delta t = t_f - t_i$ and can preferably, but not necessarily, be the interval during which the crankshaft 18 has rotated sixty degrees (60°). The kinetic energy variation is preferably computed for only the period between twenty degrees (20°) $\Theta_{11}$ before top dead center and forty degrees (40°)$\Theta_{12}$ after top dead center and forty degrees (40°)$\Theta_{21}$ after top dead center and one hundred degrees (100°)$\Theta_{22}$ after top dead center, which reduces the speed data from seventy-two (72) to twelve (12) data points for one cycle of the internal combustion engine 12.

The next program step is to determine the normalized kinetic energy variations for a designated cylinder 14 or cylinders <40>. This is accomplished by dividing the kinetic energy level data by at least one predetermined constant, which can include, but is not limited to, a maximum absolute level of kinetic energy variations. optionally, to obtain greater accuracy, the normalized kinetic energy changes may be subtracted from a normalized kinetic energy value for a normal internal combustion engine 12, that is, an internal combustion engine 12 without a power loss, operating under the same conditions.

The next program step determines information that represents the torque magnitude of the internal combustion engine 12 as a function of the normalized kinetic energy variations and the average crankshaft speed <42>, which hereinafter can be represented by $T_a$. The representative torque of the internal combustion engine 12 is generated using a neural network or other suitable pattern-matching or function approximation algorithm.

According to a preferred embodiment, the crankshaft torque is determined using a neural network model based preferably, on radial basis function approximators, the output of which is a real-valued number representing the estimated engine torque at a designated test point. Each radial basis (RB) network has three layers: the input layer, the hidden layer, and the output layer. In turn, each layer has several processing units, called cells, which are joined by connections. Each connection has a numerical weight, $W_{ij}$, that specifies the influence of cell $C_i$ on cell $C_j$, and determines the behavior of the network. Each cell $C_i$ computes a numerical output that equates to the torque magnitude for the internal combustion engine 12 for the cylinder 14.

Since the illustrative, but nonlimiting, internal combustion engine 12 has six cylinders, and torque magnitude is determined as a function of kinetic energy variations due to combustion and compression effects and average crankshaft speed, the RB network for engine torque will have thirteen inputs, including: inputs one (1) through twelve (12) corresponding to the normalized kinetic energy variations for each of the cylinders 14 with two inputs for each cylinder 14 as defined in program step <38> above. Input thirteen (13) is defined as the average crankshaft speed. The cells in the input layer normalize the input signals received (preferably, between −1 and +1) and pass the normalized inputs to Gaussian processing cells in the hidden layer. This will make the inputs uniform regardless of the dimensions and units thereof. A linear mapping function is used to normalize each of the thirteen (13) inputs to the network according to its maximum and minimum variation levels, such that $$C_i = A_i + b_i I_i (i=1,2, \ldots 13)$$

Where $I_i$ is the ith real valued input, $-1 \leq C_i \leq +1$ is the normalized output of the ith input cell, and the coefficients $A_i$ and $b_i$ are tabulated values maintained in memory.

The hidden layer is determined from real value training examples ($E^i$) for p number of input cells, here p equaling 13. Using a real valued function, for each training example $E^i$, an intermediate cell output $C_{p+i}$ can be generated when presented with an input vector $E$ as follows:

$$C_{p+i} = f(\|E - E^i\|)$$

In this case, the normalized quantity $\|E - E^i\|$ is the Euclidean distance between the input vector E and the training vector $E^i$. For the function, a Gaussian distribution function such as the function $$f(E - E^i) = \exp\left[ -\left( \frac{\|E - E^i\|}{\sigma_i} \right)^2 \right]$$

is used where $\sigma_i$ is the width of the ith hidden cell. Preferably, the hidden cell activations $C_{p+i}$ from the input training data sets are computed using a default value of $\sigma_i = 0.833$ for all hidden cells.

For the output layer, the intermediate cells are used as a basis to represent real valued outputs, which is the predicted torque magnitude for the particular cylinder 14. Assuming that the torque magnitude is a linear function, the torque magnitude is a summary of the hidden cell outputs $C_{p+i}$ and the numerical weights such that:

$$\overset{o}{C} = \sum_{j=1}^{m} W_{p+j} C_{p+j}$$

where m is the number of cells in the hidden layer.

As an alternative method, using a fixed-point processor, a linear neural network approach can be used. In the linear neural network approach, the inputs and outputs are in binary −1 (or 0) +1 format, rather than the real-valued input and output data used in the radial basis neural network. With this approach, torque magnitude is determined to be the highest-valued output.

As shown in FIG. 2A and proceeding down the path to determine information that is representative of a power loss condition for a designated cylinder 14 of an internal combustion engine 14 in program step <44>, the kinetic energy variations of the rotatable crankshaft 18 due to each firing event for each cylinder 14 are then computed by the electronic control module 24. This computation involves computing the variations in kinetic energy for each firing (combustion) event for each cylinder 14. This program step involves integrating the average speed fluctuation of crankshaft 18 determined in program step <36> with respect to a predetermined angle for the rotatable crankshaft 18 from $\theta_1$ to $\theta_2$ where $\theta_1$ is defined as the desired crankshaft angle before the top dead center and $\theta_2$ is the crankshaft angle after the top dead center, and $\theta_2 - \theta_1 = 720°/N$ wherein N is the number of cylinders. By integrating the speed of the rotatable crankshaft 18, the amount of speed information for further processing per cycle of the internal combustion engine 12 is reduced from nN to N, where n is the number of teeth passing the speed sensor per cylinder firing.

The instantaneous kinetic energy of the rotating parts of the internal combustion engine 12 is given by:

$$E_k = \tfrac{1}{2} I_e \dot{\theta}^2$$

where $I_e$ is the average inertia of all rotating parts of the internal combustion engine 12, and $\dot{\Theta}$ is the instantaneous angular velocity of of the crankshaft 18.

The variation of the shaft kinetic energy due to combustion disturbances is given by differentiating $E_k$, or $$\delta E_k = I_e \delta \dot{\theta}$$
$$\dot{\theta} = I_e \delta \dot{\theta} \frac{d\theta}{dt}$$

where $\delta \dot{\Theta}$ is the small angular velocity fluctuation of the crankshaft 18 about its mean cycle value.

The total amount of kinetic energy that the rotatable crankshaft 18 and other rotating parts have gained or lost during the time period $\Delta t$ is therefore given by integrating $\delta E_k$ with respect to time; i.e., total energy gained (or lost)=

$$\int_{ti}^{tf} \delta E k \, dt = Ie \int_{\Theta i1}^{\Theta i2} \delta \Theta \, d\Theta$$

where $\Delta t = t_f - t_i$ and can preferably, but not necessarily, be the interval during which the crankshaft 18 has rotated one hundred and twenty degrees (120°) centered about a top dead center position for a cylinder 14. The kinetic energy variation is preferably computed for only the period between sixty degrees (60°) $\Theta_{11}$ before top dead center and sixty degrees (60°) $\Theta_{12}$ after top dead center, which reduces the speed data from seventy-two (72) to six (6) data points for one cycle of the internal combustion engine 12.

The next program step is to determine the normalized kinetic energy variations for a designated cylinder 14 or cylinders <46>. This is accomplished by dividing the kinetic energy level data by at least one predetermined constant, which can include, but is not limited to, a maximum absolute level of kinetic energy variation. Optionally, to obtain greater accuracy, the normalized kinetic energy changes may be subtracted from a normalized kinetic energy value for a normal internal combustion engine 12, that is, an internal combustion engine 12 without a power loss, operating under the same conditions.

The next program step <48>, involves sensing the amount of fuel being delivered to the internal combustion engine 12. This is accomplished by utilizing the fuel quantity sensor 27 and generating a signal that is communicated to the electronic control module 24. Preferably, this fuel flow rate can be a derived value that correlates or even equals the rack value instead of utilizing a sensor.

The next program step <50>, the average fuel flow rate is determined from the rack value or the fuel quantity signal by the electronic control module 24.

Program step <52> determines information that represents the magnitude of relative power loss condition for a designated cylinder 14 for the internal combustion engine 12 as a function of the normalized kinetic energy variations, the average crankshaft speed and the average fuel flow rate. The representative magnitude of a power loss condition of the internal combustion engine 12 is generated using a neural network or other suitable pattern-matching algorithm. This representative magnitude of power loss for each designated cylinder is hereby designated as $T_i$ where i=1, 2, 3, 4 . . . N and N= the number of cylinders 14 for the internal combustion engine 12.

According to a preferred embodiment, the power loss is determined using a neural network model based preferably, on radial basis function approximators, the output of which is a real-valued number representing the estimated power loss for each tested cylinder 14 at a designated test point. Each radial basis (RB) network has three layers: the input layer, the hidden layer, and the output layer. In turn, each layer has several processing units, called cells, which are joined by connections. Each connection has a numerical weight, $W_{ij}$, that specifies the influence of cell $C_i$ on cell $C_j$, and determines the behavior of the network. Each cell $C_i$ computes a numerical output that equates to the power loss for the cylinder 14 of the internal combustion engine 12.

Since the illustrative, but nonlimiting, internal combustion engine 12 has six cylinders, and power loss magnitude is determined as a function of kinetic energy variations and average crankshaft speed, the RB network for each cylinder will have eight inputs, including: inputs one (1) through six (6) corresponding to the normalized kinetic energy variations for each of the cylinders as defined in program step <44> above. Input seven (7) is defined as the average crankshaft speed and input eight (8) is defined as the average fuel flow rate. The cells in the input layer normalize the input signals received (preferably, between −1 and +1) and pass the normalized inputs to Gaussian processing cells in the hidden layer. This will make the inputs uniform regardless of the dimensions and units thereof. A linear mapping function is used to normalize each of the eight (8) inputs to the network according to its maximum and minimum variation levels, such that $$C_i = A_i + b_i I_i (i=1,2, \ldots 8)$$

Where $I_i$ is the ith real valued input, $-1 \leq C_i \leq +1$ is the normalized output of the ith input cell, and the coefficients $A_i$ and $b_i$ are tabulated values maintained in memory.

The hidden layer is determined from real value training examples ($E^i$) for p number of input cells, here p equaling 8. Using a real valued function, for each training example $E^i$, an intermediate cell output $C_{p+i}$ can be generated when presented with an input vector E as follows:

$$C_{p+i} = f(\|E - E^i\|)$$

In this case, the normalized quantity $\|E - E^i\|$ is the Euclidean distance between the input vector E and the training vector $E^i$. For the function, a Gaussian distribution function such as the function $$f(E - E^i) = \exp\left[-\left(\frac{\|E - E^i\|}{\sigma_i}\right)^2\right]$$

is used where $\sigma_i$ is the width of the ith hidden cell. Preferably, the hidden cell activations $C_{p+i}$ from the input training data sets are computed using a default value of $\sigma_i$=0.833 for all hidden cells.

For the output layer, the intermediate cells are used as a basis to represent real valued outputs, which is the predicted torque magnitude for the particular cylinder 14. Assuming that the torque magnitude is a linear function, the torque magnitude is a summary of the hidden cell outputs $C_{p+i}$ and the numerical weights such that:

$$\overset{o}{C} = \sum_{j=1}^{m} W_{p+j} C_{p+j}$$

where m is the number of cells in the hidden layer.

As an alternative method, using a fixed-point processor, a linear neural network approach can be used. In the linear neural network approach, the inputs and outputs are in binary −1 (or 0)+1 format, rather than the real-valued input and output data used in the radial basis neural network. With this approach, power loss is determined to be the highest-valued output.

Figure 2B:
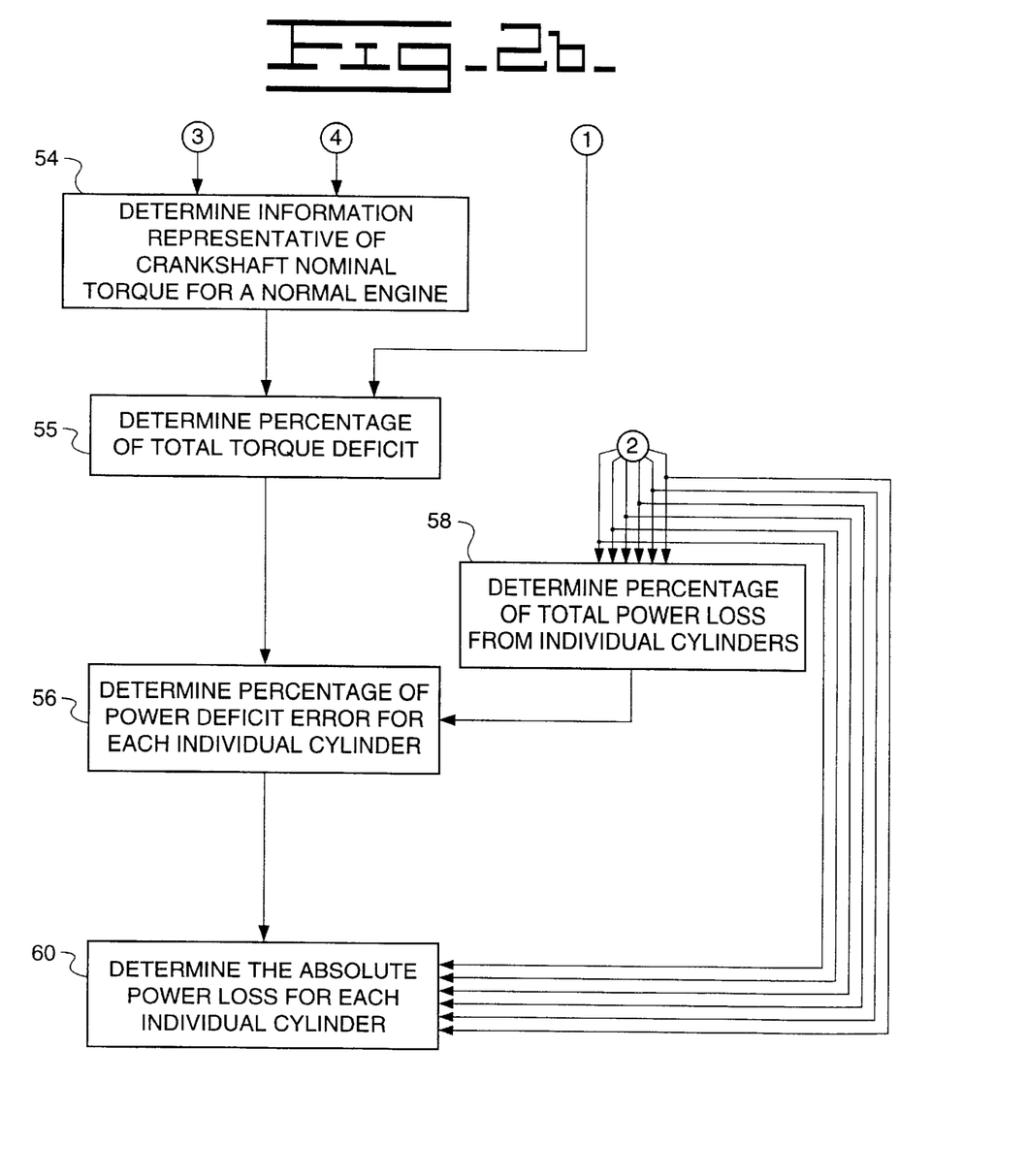

Referring now to FIG. 2B, program step <54> then determines information representing nominal torque of a crankshaft 18 of a normal internal combustion engine 12. These values can be found on a look-up table associated with the electronic control module 24 based on average crankshaft 18 speed input received from program step <34> and average fuel flow rate input received from program step <50> with both program steps shown in FIG. 2A. The nominal torque values can also be derived by a neural network or a two-dimensional map. This nominal torque is hereby designated as $T_n$.

The next program step is to determine the percentage of total torque deficit <55>. This involves utilizing the torque magnitude $T_a$ of the internal combustion engine 12 as a function of the normalized kinetic energy variations due to each firing event and each compression event and the average crankshaft speed as detailed in program step <42>, shown in FIG. 2A, and subtracting the nominal torque $T_n$ of a crankshaft 18 of an internal combustion engine 12 as found in program step <54> above. This value would then be divided by the nominal torque $T_n$ of a crankshaft 18 of an internal combustion engine 12 as found in program step <54> and multiplied by one hundred (100) to obtain a percentage of total torque deficit, which hereinafter is designated as $T_d$. The equation would be: $(T_a-T_n)/T_n * 100 = T_d$ After program step <52>, information that represents the magnitude of a power loss condition $T_i$ for a designated cylinder 14 for the internal combustion engine 12 as a function of the normalized kinetic energy variations due to firing events, the average crankshaft speed and the average fuel flow rate is then summed and divided by the number of cylinders 14 in program step <58>. Program step <58> determines the percentage of total power loss for individual cylinders, which hereinafter is designated as $T_c$. The equation would be: $(\Sigma T_i/N) = T_c$ where N=the number of cylinders 14 for the internal combustion engine 12.

Program step <56> then determines the percentage of power deficit error for each individual cylinder 14. The percentage of total power loss for individual cylinders $T_c$ found in program step <58> is subtracted from the percentage of total torque deficit $T_d$ found in program step <55> resulting in the percentage of power deficit error for each cylinder 14, which hereinafter is designated as $T_e$. The equation would be: $T_d - T_c = T_e$ The final program step <60> determines the absolute power loss for each individual cylinder, which is hereinafter designated as $T_{pl}$. This absolute power loss is the summation of the information that represents the magnitude of a power loss condition for a designated cylinder 14 for the internal combustion engine 12 as a function of the normalized kinetic energy variations due to firing events, the average crankshaft speed and the average fuel flow rate as found in program step <52>, which was previously described as $T_i$ with the percentage of power deficit error for each individual cylinder 14 found in program step <56>, which was previously designated as $T_e$. The equation would be $T_{pl} = T_i + T_e$ where i=1,2,3,4 ... N and N=the number of cylinders 14 for the internal combustion engine 12.

Industrial Applicability

The present invention is advantageously applicable in determining an absolute power loss condition in each individual cylinder in an internal combustion engine having distinct firing (combustion) events and compression events. This method and system provide the significant advantage of detecting an all-cylinder power loss condition without having numerous data sets available for training The representative absolute power loss condition can be responsively produced and communicated to an onboard indicator light, stored and/or transmitted to a base station for subsequent action. This present invention can be utilized on virtually any type and size of internal combustion engine.

In view of the foregoing, it is readily apparent that the subject absolute power loss condition in a reciprocating internal combustion engine in a very simple and effective manner.

The following description is only for the purposes of illustration and is not intended to limit the present invention as such. It will be recognizable, by those skilled in the art, that the present invention is suitable for a plurality of other applications.

Other aspects, objects and advantages of the present invention can be obtained from a study of the drawings, the disclosure and the appended claims.

What is claimed is:

1. A system for detecting absolute power loss in a cylinder for a reciprocating internal combustion engine, said internal combustion engine having at least one cylinder and a rotatable crankshaft, comprising:

an input mechanism that generates a signal, including a value for rotational crankshaft speed for a plurality of designated crankshaft rotational positions over a predetermined number of cycles of rotation for each of said crankshaft positions; and an electronic controller for determining an average crankshaft speed and an average crankshaft speed fluctuation for each of said crankshaft positions and determining information representative of crankshaft kinetic energy variations due to each firing event in said cylinder and determining information representative of crankshaft kinetic energy variations due to each firing event and each compression event in said cylinder and determining information representative of an average fuel flow rate and determining information representative of power loss as a function of said crankshaft kinetic energy variations due to each said firing event, said average crankshaft speed and said average fuel flow rate and responsively producing a representative crankshaft power loss signal and determining information representative of crankshaft torque for said cylinder as a function of said crankshaft kinetic energy variations due to each said firing event and each said compression event and said average crankshaft speed and responsively producing a representative crankshaft torque signal and determining information representative of absolute power loss for each said cylinder.

2. The system, as set forth in claim 1, wherein said electronic controller determines normalized kinetic energy variations for said cylinder due to each said firing event and each said compression event, wherein information representative of average crankshaft torque is determined as a function of said normalized kinetic energy variations for said cylinder due to each said firing event and said compression event and said average crankshaft speed.

3. The system, as set forth in claim 1, wherein said electronic controller determines information representative of absolute power loss for each said cylinder includes a step of determining information representative of nominal crankshaft torque from a normal engine.

4. The system, as set forth in claim 3, wherein said electronic controller determines information representative of nominal crankshaft torque from a normal engine utilizing a look-up table.

5. The system, as set forth in claim 3, wherein said electronic controller determines information representative of absolute power loss for each said cylinder includes a step of determining a percentage of total torque deficit as the percent difference between said nominal crankshaft torque from said normal engine and said information representative of said crankshaft torque for said cylinder as a function of said crankshaft kinetic energy variations due to each said firing event and said compression event and said average crankshaft speed.

6. The system, as set forth in claim 5, wherein said electronic controller determines information representative of absolute power loss for each said cylinder includes a step of determining a percentage of total power loss for all of said cylinders associated with said internal combustion engine by summing information representative of power loss for said cylinder as a function of said crankshaft kinetic energy variations due to each said firing event, said average crankshaft speed and said average fuel flow rate and dividing by the total number of said cylinders associated with said internal combustion engine.

7. The system, as set forth in claim 6, wherein said electronic controller determines information representative of absolute power loss for each said cylinder includes a step of determining a percentage of power deficit error for each of said cylinders associated with said internal combustion engine by subtracting said percentage of total power loss for all of said cylinders associated with said internal combustion engine from said percentage of power deficit error for each of said cylinders associated with said internal combustion engine.

8. The system, as set forth in claim 7, wherein said electronic controller determines information representative of absolute power loss for each said cylinder includes a summation of said percentage of power deficit error for each of said cylinders associated with said internal combustion engine and said information representative of power loss for each said cylinder as a function of said crankshaft kinetic energy variations due to each said firing event, said average crankshaft speed and said average fuel flow rate.

9. The system, as set forth in claim 1, wherein said electronic controller responsively produces a representative absolute power loss utilizing a neural network.

10. The system, as set forth in claim 1, wherein said electronic controller produces a representative absolute power loss signal utilizing a radial basis neural network.

11. A method for detecting absolute power loss in a cylinder for a reciprocating internal combustion engine, said internal combustion engine having at least one cylinder and a rotatable crankshaft, comprising the steps of:

sensing rotational crankshaft speed for a plurality of designated crankshaft rotational positions over a predetermined number of cycles of rotation for each of said crankshaft positions;

determining an average crankshaft speed;

determining an average crankshaft speed fluctuation for each of said crankshaft positions;

determining information representative of crankshaft kinetic energy variations due to each firing event in said cylinder;

determining information representative of crankshaft kinetic energy variations due to each firing event and each compression event in said cylinder;

determining information representative of an average fuel flow rate;

determining information representative of power loss for said cylinder as a function of said crankshaft kinetic energy variations due to each said firing event, said average crankshaft speed and said average fuel flow rate and responsively producing a representative power loss signal;

determining information representative of crankshaft torque for said cylinder as a function of said crankshaft kinetic energy variations due to each said firing event and each said compression event and said average crankshaft speed and responsively producing a representative crankshaft torque signal; and determining information representative of absolute power loss for each said cylinder.

12. The method, as set forth in claim 11, further including a step of determining normalized kinetic energy variations for said cylinder, wherein said information representative of crankshaft torque for said cylinder is determined as a function of said normalized kinetic energy variations due to each said firing event and each said compression event and said average crankshaft speed.

13. The method, as set forth in claim 11, wherein said step of determining information representative of absolute power loss for each said cylinder includes a step of determining information representative of nominal crankshaft torque from a normal engine.

14. The method, as set forth in claim 13, wherein said step of determining information representative of nominal crankshaft torque from a normal engine includes utilizing a look-up table.

15. The method, as set forth in claim 13, wherein said step of determining information representative of absolute power loss for each said cylinder includes a step of determining a percentage of total torque deficit as a percent difference between said nominal crankshaft torque from said normal engine and said information representative of said crankshaft torque for said cylinder as a function of said crankshaft kinetic energy variations due to each said firing event and each said compression event and said average crankshaft speed.

16. The method, as set forth in claim 15, wherein said step of determining information representative of absolute power loss for each said cylinder includes a step of determining a percentage of total power loss for all of said cylinders associated with said internal combustion engine by summing said information representative of power loss for said cylinder as a function of said crankshaft kinetic energy variations due to each said firing event, said average crankshaft speed and said average fuel flow rate and dividing by a total number of said cylinders associated with said internal combustion engine.

17. The method, as set forth in claim 16, wherein said step of determining information representative of absolute power loss for each said cylinder includes a step of determining a percentage of power deficit error for each of said cylinders associated with said internal combustion engine by subtracting said percentage of total power loss for all of said cylinders associated with said internal combustion engine from said percentage of total torque deficit.

18. The method, as set forth in claim 17, wherein said step of determining information representative of absolute power loss for each said cylinder includes a summation of said percentage of power deficit error and said information representative of power loss for each said cylinder as a function of said crankshaft kinetic energy variations due to each said firing event, said average crankshaft speed and said average fuel flow rate for each of said cylinders associated with said internal combustion engine.

19. The method, as set forth in claim 11, wherein said step of responsively producing a representative absolute power loss signal is performed using a neural network.

20. The method, as set forth in claim 11, wherein said step of responsively producing a representative absolute power loss signal is performed using a radial basis neural network.

* * * * *